United States Patent [19]
Stapleton et al.

[11] Patent Number: 6,106,565
[45] Date of Patent: Aug. 22, 2000

[54] SYSTEM AND METHOD FOR HARDWARE EMULATION OF A DIGITAL CIRCUIT

[75] Inventors: Warren Stapleton, Los Gatos; Keith R. Shakel, San Jose; Fred C. Jair, Cupertino, all of Calif.; Jennifer B. Pencis, Austin, Tex.; Mrityunjay R. Hiremath, Sunnyvale, Calif.

[73] Assignee: Advanced Micro Devices, Inc., Austin, Tex.

[21] Appl. No.: 08/807,162

[22] Filed: Feb. 27, 1997

[51] Int. Cl.[7] .......................... G06F 9/455; G06F 15/173; G06F 16/16

[52] U.S. Cl. .............................. 703/23; 703/24; 709/226; 709/245

[58] Field of Search ................................ 395/500, 182.08, 395/182.09, 182.1, 182.11, 500.44, 500.45; 364/488, 578; 703/23, 24; 709/226, 245

[56] References Cited

U.S. PATENT DOCUMENTS

| | | | |
|---|---|---|---|
| 4,453,211 | 6/1984 | Askinazi et al. | 364/200 |
| 4,992,934 | 2/1991 | Portanova et al. | 712/209 |
| 5,051,888 | 9/1991 | Hansen et al. | 395/500 |
| 5,093,776 | 3/1992 | Morss et al. | 395/500 |
| 5,228,136 | 7/1993 | Shimizu et al. | 711/141 |
| 5,357,626 | 10/1994 | Johnson et al. | 395/500 |
| 5,371,852 | 12/1994 | Attanasio et al. | 709/245 |
| 5,392,420 | 2/1995 | Balmer et al. | 395/500 |
| 5,481,726 | 1/1996 | Kumaki et al. | 709/226 |
| 5,574,927 | 11/1996 | Scantlin | 395/500 |
| 5,615,327 | 3/1997 | Magee et al. | 395/182.1 |
| 5,644,703 | 7/1997 | Kurakazu et al. | 395/183.11 |
| 5,717,903 | 2/1998 | Bonola | 395/500 |
| 5,752,006 | 5/1998 | Baxter | 395/500 |
| 5,764,962 | 7/1998 | Buzbee | 703/23 |
| 5,884,077 | 3/1999 | Suzuki | 709/105 |
| 5,913,068 | 6/1999 | Matoba | 713/322 |

OTHER PUBLICATIONS

Elleuch et al.; Process migration protocols for massively parallel systems; IEEE 1st Int. Conf. Massively Parallel Comp. Syst.; pp. 84–95, May 1994.

*Primary Examiner*—Kevin J. Teska
*Assistant Examiner*—Hugh Jones
*Attorney, Agent, or Firm*—Skjerven, Morrill, MacPherson, Franklin and Friel

[57] ABSTRACT

A development system includes two processors which can each act as the central processing unit of the development system. Control is passed between the processors via a system management mode (SMM) interrupt under the X86 architecture. In one embodiment, one of the processor is a processor to be emulated and the other processor is an emulating processor. Since the emulating processor runs at a much slower clock speed than the emulated processor, an application program can be run by the emulating processor until a region of interest is reached. The control of the application program can then be transferred by the SMM interrupt to the emulated processor. This arrangement allows a new compatible microprocessor to be efficiently developed using a hardware emulation system.

9 Claims, 4 Drawing Sheets

SYSTEM AND METHOD FOR HARDWARE EMULATION OF A DIGITAL CIRCUIT

CROSS REFERENCE TO APPENDIX INCLUDING A COMPUTER PROGRAM LISTING

Appendix A, which is a part of the present disclosure, is an appendix consisting of 10 sheets of listing of a computer program and related data in one embodiment of this invention. This listing of computer programs contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates to design, development and testing of complex digital circuits. In particular the present invention relates to a hardware emulation of complex digital circuits, e.g. a microprocessor.

2. Discussion of the Related Art

In developing a complex integrated circuit, e.g. a microprocessor, hardware emulation is a useful technique to test and debug a design. In hardware emulation, the integrated circuit's logic design is compiled, using various automated tools, into a logic circuit which can be implemented in an hardware emulation system, such as any one of the hardware emulation systems available from Quickturn Systems, Inc., Mountain View, Calif. Such an emulation system consists primarily of a "breadboard" of field programmable gate arrays (FPGAs), and software for programming and controlling the breadboard to emulate the desired logic circuit. An integrated circuit emulated on such a breadboard is effectively an operating working model of the final integrated circuit, and thus can be used reliably to validate the design, by running actual software targeted for the integrated circuit. For example, a developer of an X86 compatible microprocessor would connect the emulation circuit into a system board and debug the design by running on the emulation circuit programs compiled for an X86 compatible microprocessor. When used in this manner, the emulation circuit is said to be "fast simulating" the X86 microprocessor. However, even though hardware emulation provides the fastest means to emulate an integrated circuit, the emulated design still runs hundreds of time slower than the actual integrated circuit it emulates. For example, an emulation circuit for a 200 Megahertz microprocessor can be emulated only at 500 Kilohertz.

With such discrepancy in speed, while it is possible to execute the target software, the process can be extremely frustrating to the development engineer. For example, at the beginning of a design cycle, design errors often lead to hard errors, or "hard crashes", that require the emulated circuit to reset ("reboot"). A reboot sequence includes reinitializing the system and loading an operating system, e.g. DOS or Windows NT[1]. However, because of the speed discrepancy, a reboot sequence that takes less than a minute in the target microprocessor can take hours on an emulated circuit, thereby limiting the usefulness of the emulating circuit.

[1] "DOS" and "Windows NT" are believed trademarks of Microsoft Corporation, Redmond, Wash.

Thus, a method and an apparatus that would allow the emulation circuit to begin execution from an intermediate execution point in a program sequence without requiring the emulation circuit to perform the time-consuming execution sequence to arrive at the same execution point is desired. Preferably, the intermediate execution point can be specified to a particular instruction boundary.

SUMMARY OF THE INVENTION

The present invention allows an emulation circuit to begin execution from a specified instruction boundary. Such an instruction boundary can be an instruction immediately preceding a hard error, for example. Thus, a development engineer can quickly "zoom in" an execution sequence of interest, without incurring the extremely time-consuming overhead of initializing the emulation circuit.

The present invention provides a computer system which includes (a) a first terminal for receiving an interrupt signal, (b) a second terminal for receiving a halt signal, (c) a main memory, (d) a first processor, and (e) a second processor. In response to the interrupt signal, the first processor (i) saves the states of a program executing in the first processor in the main memory system; and then halts operation of the first processor. The second processor, which receives both the interrupt signal and the halt signal, in response to the interrupt signal, (i) waits until the halt signal is deasserted; (ii) restores the saved states of the program from the main memory into the second processor; and (iii) resumes execution of the program from the restored saved states.

In one embodiment, the computer system is implemented in a development system. In that development system, the first processor is a processor to be emulated, and the second processor is a logic circuit emulating the first processor. Further, in the development system, switches are provided for asserting the interrupt signal and deasserting the halt signal respectively. Alternatively, devices such as a logic analyzer can be used to generate the interrupt or halt signal. The present invention can be implemented in processors supporting operations under system management mode (SMM) of the X86 architecture. When the emulated processor and the emulating processor operate in different clock speeds, the computer system further includes a clock circuit generating the requisite clock frequencies.

A method of the present invention transfers control between two processors. The processors are configured in a computer system, such that either of the processors can control operation of the computer system, the processors being configured for responding to a common interrupt signal, which initially places one of the processors in a hold state. The computer system initially executes a program in the first processor (i.e., the initially executing processor, typically the emulated processor). An interrupt signal, which has a higher execution priority than the executing program, is then generated to both processors. The interrupt signals can be provided, for example, by analyzing the operation of the executing processor. If the instructions executed can be carefully stepped, such as by the use of a logic analyzer, the interrupt signal can be generated to cause an interrupt service routine to be invoked at a specific instruction boundary. Upon detection of the interrupt signal, execution of the program is then suspended, with the execution states of the program in the first processor saved to a memory device. Then, the first processor is then placed in a hold state. The second processor, i.e., the processor halted hitherto, is then released from its hold state, and the saved states of the program are then loaded from the memory device to the second processor. Finally, execution of the program is resumed in the second processor from the restored saved states.

In one embodiment of the present invention, the step of saving the execution states of the program, and the step of placing the first processor in a hold state are controlled by an interrupt handling program executed in the first processor. Similarly, the step of loading the saved states can be controlled by an interrupt handling program executed in the second processor, in which the interrupt handling program returns from servicing the interrupt signal to allow carrying out in the second processor the step of resuming execution of the program. In fact, the interrupt handling program of the first and second processors can be two copies of a common interrupt handling program. In that instance, the common interrupt handling program performs the respective steps in the first and second processors according to the identity of the processor executing the common interrupt handling program.

When the first and second processors operate at different clock frequencies, the clock frequencies can be generated from a common clock circuit.

The present invention is better understood upon consideration of the detailed description below and the accompanying drawings.

DETAILED DESCRIPTION OF THE PREFERRED EMBODIMENTS

In the following description, the present invention is illustrated in the context of a development system for developing a compatible microprocessor. Even so, one skilled in the art would appreciate that the techniques discussed herein are applicable to all areas of digital logic design.

Figure 1:
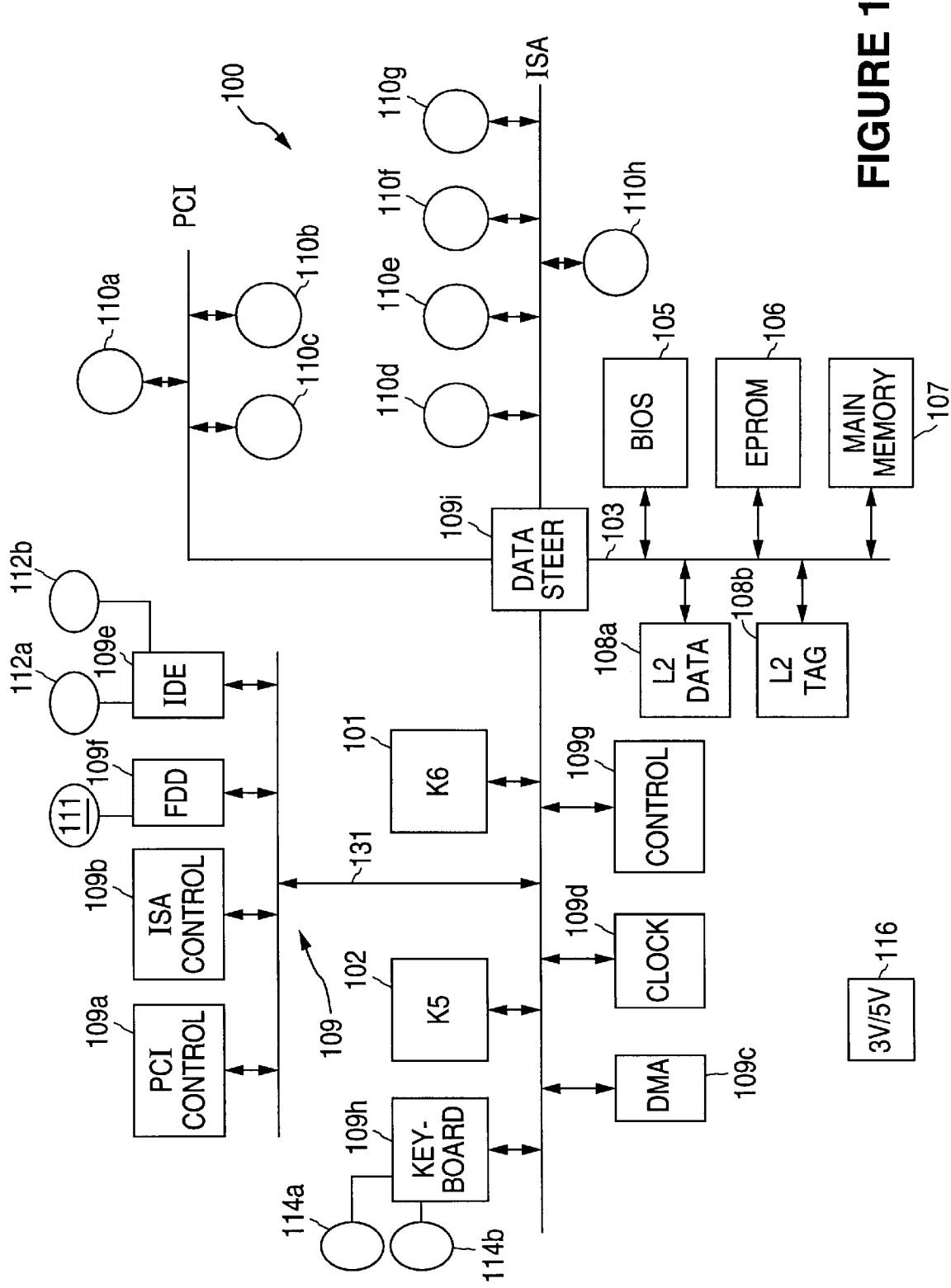
FIG. 1 is a block diagram of a development system 100 for a microprocessor, in an embodiment of the present invention.

FIG. 1 is a block diagram of a development system 100 for a microprocessor, in an embodiment of the present invention. As shown in FIG. 1, the microprocessor under development (hereinafter "processor 101"), typically implemented in the FPGAs of a hardware emulation system (not shown) and interfaced with development system 100 through a connector, is configured to work cooperatively with another microprocessor (hereinafter "processor 102"), which can execute at least a subset of the instruction set to be implemented in processor 101. Using the popular X86 microprocessor family as an example to further illustrate this development system, processor 101 can be a "next-generation" microprocessor under development, and processor 102 can be a microprocessor of the X86 family, such as an AMD K5 microprocessor, available from Advanced Micro Devices, Inc., Sunnyvale, Calif.

According to the present invention, either processor 102 or processor 101 can assume the role of the central processing unit ("CPU") for development system 100. As shown in FIG. 1, the CPU accesses over a memory bus 103 (not shown) to a main memory 107, which includes (i) non-volatile memories 105 and 106, for storing the basic input and output system ("BIOS") programs and the microcodes of other system programs, respectively, and (ii) main storage 107, implemented by dynamic random access memories (DRAM). In addition, the CPU accesses secondary cache memory 108, also provided on memory bus 103. In this embodiment, a "synchronous burst" static random access memory is used to implement the data portion 108a of secondary cache memory 108. A secondary cache memory tag array 108b is provided for the tag portion of secondary cache memory 108. Built-in primary cache memories are provided in development system 100 for both processor 101 and processor 102. A "chipset" 109, which includes PCI and ISA bus controllers 109a and 109b, DMA controller 109c, clock system 109d, IDE and floppy disk controllers 109e and 109f, memory controller 109g, keyboard controller 109h and "data steering" logic circuit 109i, is provided in development system 100 to allow the CPU to interface with a host of peripheral devices. In the embodiment shown in FIG. 1, development system 100 provides three industry standard PCI "slots" 110a–110c and four industry standard ISA slots 110d–110h. Floppy disk controller 109f supports up to two floppy drives over floppy drive port 111. Likewise, IDE controller 108e supports up to four IDE devices over IDE ports 112a and 112b. Data steering logic circuit 109i steers data among the various devices and data buses in development system 100. Keyboard controller 109h supports both an industry standard "PC" keyboard interface 114a and an industry standard "PS/2" keyboard interface 114b. LEDs, not illustrated, are provided to indicate certain operating conditions conventionally provided in a "PC" type motherboard. Power to development system 100 is provided by power supply, not illustrated. A voltage regulation circuit 116 provides output voltages 3 volts and 5 volts for processor 102 and the various integrated circuits implementing chipset 109.

In this embodiment, (a) non-volatile memories 105 and 106 can be implemented by such electrically programmable read-only memory (EPROM) integrated circuits as the 27C256 or 27C010 EPROMs, (b) clock system 109d can be implemented by a MACH 210 clock generation integrated circuit, (c) the data portion 108a of secondary cache memory 108 can be implemented by MT58LC32K32 static random access memories (SRAMs), (d) the tag array 108b of secondary cache memory 108 can be implemented by CY7B180/181 SRAMs, (e) floppy disk controller 109f can be implemented by an FDC37C669 integrated circuit, which also includes support for a host interface, two serial ports and one parallel port; and (f) keyboard interface 109h can be implemented by a 8042 keyboard interface integrated circuit. The remaining logic circuits of development system 100 can be implemented as custom logic circuits in field programmable gate arrays (FPGAs), such as those obtainable from Xilinx, Inc.

Because processor 101 emulates processor 102, the signals received and driven by processor 101 and processor 102 are substantially identical. Thus, except for the signals discussed below, corresponding signals of processor 101 and processor 102 are commonly connected in development system 100. Because, at any given time, only one of processor 101 and processor 102 is executing, while the other processor is in a "hold" state, only one processor is actively driving the commonly connected output signals. The output terminals of the processor under a "hold" state are tristated.

During a "hold" state, a processor asserts an output signal "HLDA" (hold acknowledge). By convention under the X86 architecture, a "system management mode (SMM)" interrupt ("SMI"), is trapped by a processor, whether or not the processor is executing or halted. The present invention takes advantage of this feature to enable passing control, or "switching over" of development system 100 between processor 101 and processor 102. SMM is a standard system operating mode under the X86 architecture which is used typically for power saving applications. Under SMM, a protected region of the memory space is made available for running certain applications programs typically geared towards energy saving operations.

Figure 2:
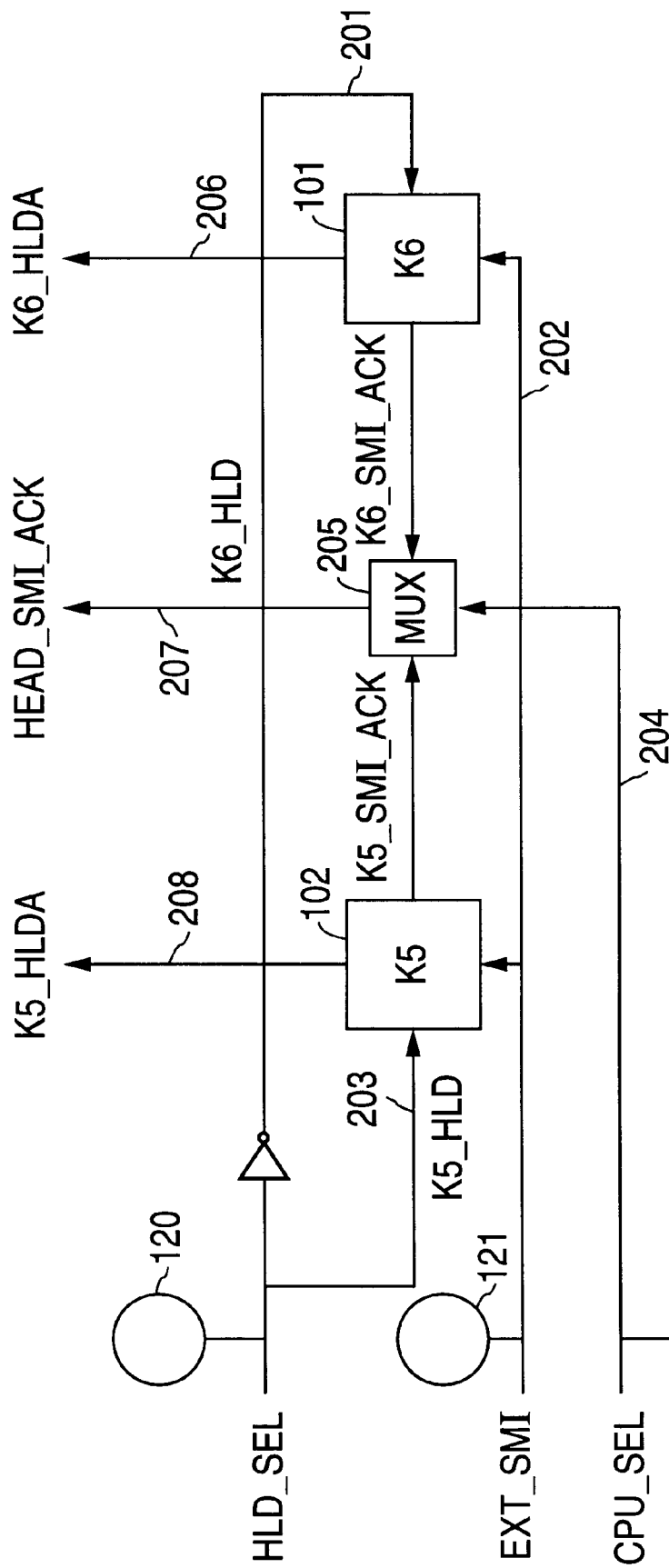
FIG. 2 shows a hardware configuration in development system 100 which handles the HLDA and SMI_ACK signals of processor 101 and processor 102, so as to enable passing control (i.e., "switching over") of development system 100 between processor 102 and processor 101, in accordance with the present invention.

Each processor, upon receiving an asserted "SMI" signal (i.e., the SMM interrupt), acknowledges the SMM interrupt by asserting an acknowledgement signal "SMI_ACK". Thus, to enable control of development system 100 to switch between processor 101 and processor 102, special hardware support is provided to handle each processor's SMI_ACK and HLDA signals, which can be asserted simultaneously, despite the fact that only one of processor 101 and microprocessor 102 is executing at any given time. FIG. 2 shows a hardware configuration in development system 100 which handles the HLDA and SMI_ACK signals of processor 101 and processor 102, so as to enable switching over of development system 100 between processor 102 and processor 101, in accordance with the present invention.

As shown in FIG. 2, a commonly connected SMI signal ("EXT_SMI") is provided at terminal 202 to both processor 101 and processor 102. The present invention causes control of development system 100 to be passed from processor 102 to processor 101 in response to an SMM interrupt. In response to an asserted EXT_SMI signal, processor 101 and processor 102 each asserts its SMI_ACK signal, labelled respectively "K6_SMI_ACK" and "K5_SMI_ACK" in FIG. 2. A multiplexor circuit 205 receives both "K6_SMI_ACK" and "K5_SMI_ACK" signals and selects, according to the value of a select signal CPU_SEL, one of these signals for output at terminal 207 as the signal "HEAD_SMI_ACK". Signal HEAD_SMI_ACK is the SMI acknowledge signal provided to chipset 109 to indicate a pending SMM interrupt to be serviced. A hold select signal HLD_SEL is provided to place one of processor 101 and processor 102 in the "hold" mode. The hold acknowledge signals of processor 101 and processor 102, labelled respectively as K6_HLDA and K5_HLDA, are output from processor 102 and processor 101 at terminals 206 and 208 to indicate whether or not processor 101 or processor 102 is placed in a hold state.

In development system 100, three special switches 120, 121 and 122 are provided to activate the aforementioned signals HLD_SEL, EXT_SMI and CPU_SEL. Switch 120 is set to couple signal HLD_SEL, or its complement, to the "hold" pins of processor 101 and processor 102. When held in a logic high signal level, the "hold" pin suspends execution of its processor (in this instance, the respective one of processor 101 and processor 102 at which the hold signal is active). Thus, switch 120 selects one of processor 101 and processor 102 to be the CPU of development system 100. Switch 121 is provided to couple the EXT_SMI signal to the SMI pins of both processor 101 and processor 102, thereby generating at each processor an SMM interrupt. Switch 122 is provided to select in multiplexor 205 which of the SMI_ACK signals to provide to chipset 109 as signal HEAD_SMI_ACK. Because processor 101 and processor 102 run at different clock frequencies, switch 122 also selects the appropriate clock frequencies for processor 101 and processor 102, during their respective tenures as the CPU of development system 100.

Under the present invention, initially, switch 120 is set to select processor 102 as development system 100's CPU. At the same time, switch 122 is set to provide the appropriate clock frequency for processor 101's operation. Processor 102 then boots development system 100 into normal operation. Under this mode, development system 100 runs in the operating clock frequency of processor 102. Thus, the process of booting up development system 100 normally takes no more than a minute or two. To exercise and debug processor 101, one or more system or application programs are then launched by processor 102. These application or system programs are allowed to run until a region of interest is reached. The region of interest can be, for example, a section of an application program which includes an instruction which is improperly executed in processor 101. When the region of interest is reached, the user activates switch 121 to generate an interrupt signal at the SMI pin of both processor 101 and processor 102. If a logic analyzer is used to analyze the output signals of processor 102, or a software tool is used to monitor the execution of an instruction sequence, the interrupt signal can be raised at a specified instruction boundary. Under existing SMM convention, even though execution of processor 101 is suspended by the hold signal asserted by switch 120, the occurrence of an SMM interrupt is still latched by processor 101. Upon receiving the SMM interrupt, processor 102 executes an interrupt service routine for handling the pending SMM interrupt.

Figure 3:
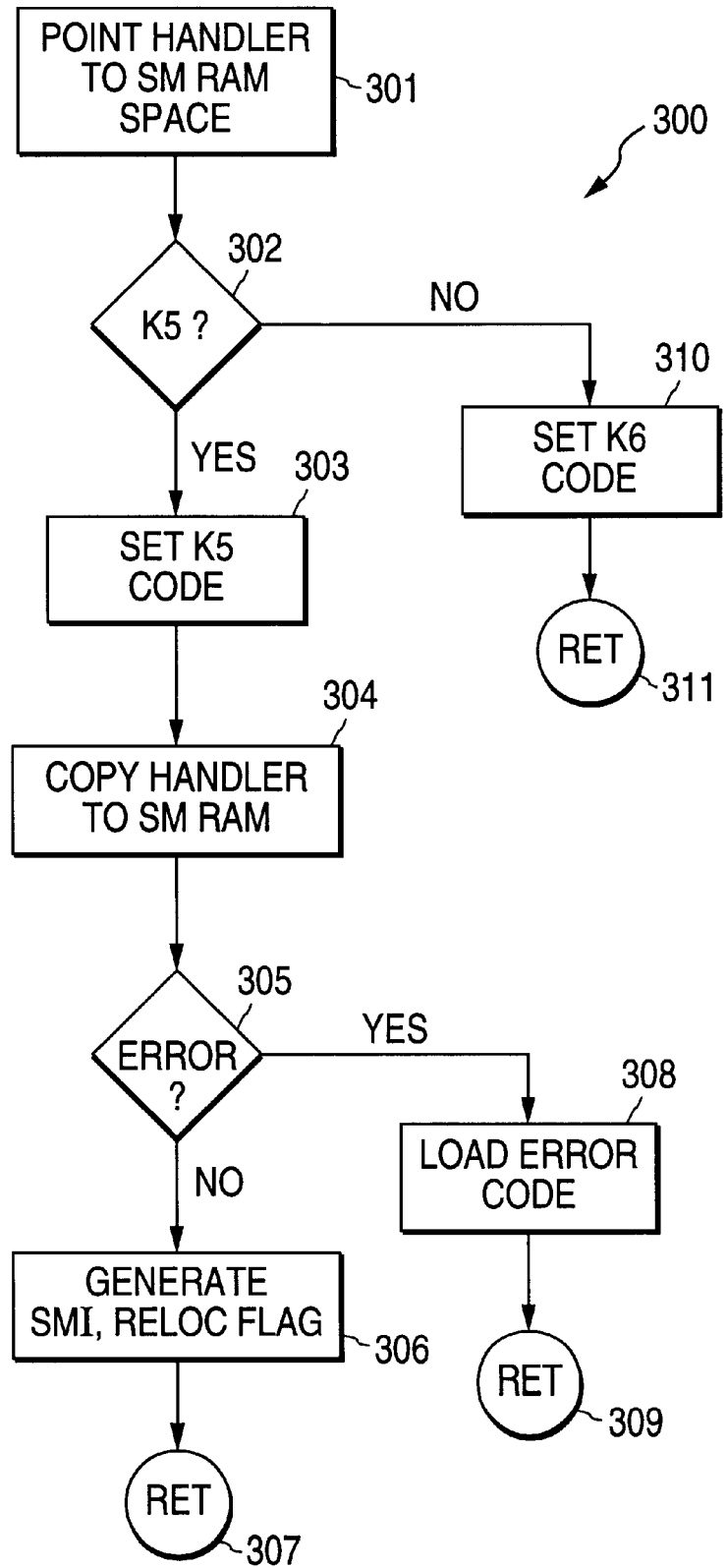
FIG. 3 is a flow chart showing the installation tasks of the switch-over handler in both processor 101 and processor 102.
Figure 4:
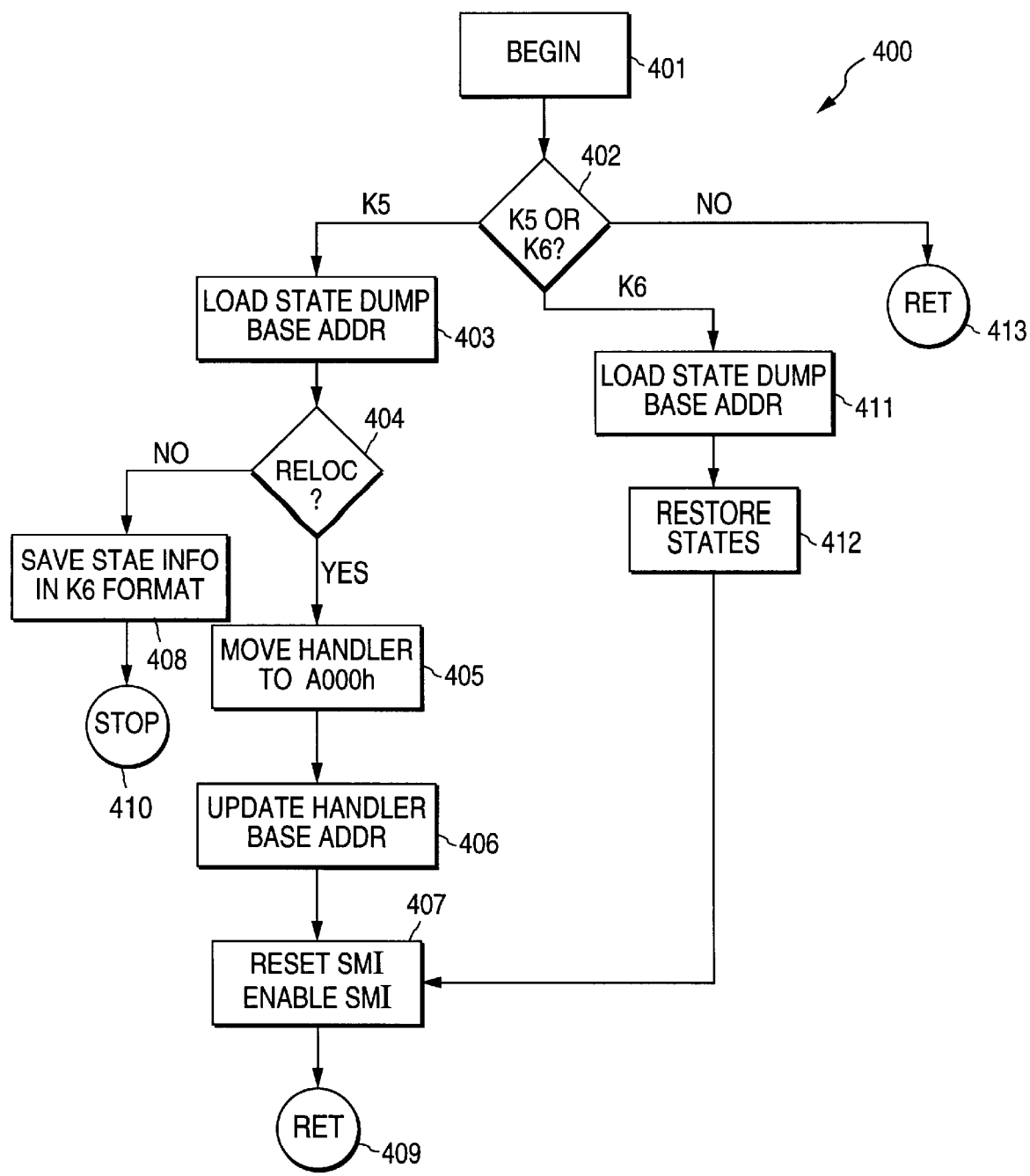
FIG. 4 is a flow-chart showing the tasks performed by the switch-over handler in both processor 101 and processor 102.

To enable control to be passed from processor 102 to processor 101, a SMM interrupt handler, called the "switch-over handler" performs the tasks illustrated in the FIGS. 3 and 4. A copy of the switch-over interrupt handler of the present embodiment, written in X86 assembly language, is included in Appendix A.

At "boot-up" time, i.e., the initialization of development system 100, the switch-over handler is installed. FIG. 3 is a flow chart 300 showing the installation tasks of the switch-over handler in both processor 101 and processor 102. After installation, the switch-over handler is executed first in processor 102 and then executed in processor 101. FIG. 4 is a flow-chart showing the tasks performed by the switch-over handler in both processor 101 and processor 102.

The installation tasks shown in FIG. 3 are executed at boot time from a location in the BIOS, illustrated in Appendix A by a switch-over handler installation routine "INST_SO_HND". At step 301 of FIG. 3, a reserved area of memory, which is located at segment address 3000h and is known as the "system management RAM" ("SMRAM"), is made available to the switch-over handler installation routine. At step 302, switch-over handler installation routine tests whether it is executed in processor 102 (i.e., "K5", the emulated microprocessor) or processor 101 (i.e., "K6", the processor under development). If the executing processor is processor 102, the identity of the processor is stored into a register of processor 102 at step 303 and the switch-over handler is copied from the BIOS to a portion of SMRAM at step 304, beginning at address 3000h:8000h where, by convention, an SMM interrupt handler is expected by a CPU. If the switch-over handler is successfully copied, as verified at step 305, a software initiated SMM interrupt is generated at step 306. This SMM interrupt is generated with a parameter value or flag (i.e., "RELOC_FLAG" in Appendix A) set to indicate a further relocation of the switch-over handler to segment address A000h is to be performed, before returning, at step 307, to the calling routine in the BIOS. If the switch-over handler is incorrectly copied, an appropriate error handler is called at step 308, before returning, at step 309, to the calling routine in the BIOS. Referring back to step 302, if the executing processor is found to be processor 101, the identity of processor 101 is stored in a register of processor 101 and the switch-over installation routine returns at step 311.

An SMM interrupt, including the software initiated SMM interrupt generated at step 306 of FIG. 3, is handled by the switch-over handler illustrated by flow chart 400 of FIG. 4. The flow chart 400 of FIG. 4 is implemented in the source code of Appendix A as near procedure "SMI_SO_HANDLER". As shown in FIG. 4, the switch-over handler first tests whether the executing processor is processor 101, processor 102 or another processor. As shown at step 402, if switch-over handler tests that the executing processor is neither processor 102 nor processor 101, an error condition is reported and the switch-over handler returns, at step 413, to the calling routine in the BIOS.

Alternatively, if switch-over handler tests that the executing processor is processor 102, switch-over handler then loads, at step 403, the current base address of the processor's state-save area in main memory 107 to preserve the states of processor 102 prior to the SMM interrupt. If the current SMM interrupt is the software interrupt generated during the installation of the switch-over handler (i.e., the SMM interrupt illustrated by step 306 of FIG. 3), the SMM interrupt handler is relocated, at step 405, from address 3000h:8000h to address A0000h:8000h, as expected by processor 101. The new base address of the processor's state-save area, i.e., segment A000h, is then updated at step 406. At step 407, switch-over handler then resets the SMI pending signal (i.e., K5_SMI_ACK) and enables SMI, so as to allow the next SMM interrupt to be raised At this point, installation and initialization of the switch-over handler are complete. Application programs can then be run on processor 102, while processor 101 is held at "hold" state, until a pre-determined switch-over point is reached.

The switch-over point is triggered by asserting signal EXT_SMI. In the present embodiment, signal EXT_SMI is asserted by activation of switch 121. Alternatively, a logic analyzer monitoring the signals on the input/output pins of processor 102 can also be used to more precisely trigger signal EXT_SMI. When signal EXT_SMI is asserted, an SMM interrupt is raised at both processor 101 and processor 102. Processor 102 responds to the SMM interrupt by saving the current processor states in the processor state-save area, and then calling the switch-over handler routine at A000h:8000h when SMM is entered (step 401). In this instance, at step 404, switch-over handler determines that the executing processor is processor 102, and the switch-over handler is already relocated to the predetermined segment address of A000h.

At step 408, the saved states in the processor's state-save area is copied to a temporary buffer area (addresses A000h:0E00h to A000h:0FFFh), being at the same time modified to the format expected by processor 101. Then, a code is posted at a debug port (80h) to indicate the successful saving of processor 102's states in the format expected by processor 101 and a switch-over to processor 101 is next expected. At step 410, processor 102 halts execution.

In this embodiment, subsequent to step 410, a user activates switch 122 to select signal K6_SMI_ACK as signal HEAD_SMI_ACK and to activate the clock signal to allow processor 101 to take over execution of the application program which is run on processor 102 prior to the current SMM interrupt. Switch 120 is then activated to release processor 101 from its hold state. When processor 101 is released from its hold state, it executes the switch-over handler at A000h:8000h to service the pending SMM interrupt generated by switch 121. The switch-over handler, upon determining at step 402 that the executing processor is processor 101, loads the current base address of the processor's state-save area and copies, at steps 411 and 412 respectively, the modified processor states from the temporary buffer area to the processor's state-save area. Upon restoring the processor states, step 407 is entered, in which signal SMI_ACK is reset to indicate that the present SMM interrupt is satisfactorily serviced. At step 407 also, the SMI input terminal of processor 101 is re-enabled. At step 409, processor 101 returns from servicing the SMM interrupt generated by switch 121.

After step 409, processor 101 inherits from the states of processor 102 prior to the SMM interrupt, executing the application program from the instruction boundary at which processor 102 was executing prior to the SMM interrupt. Thus, a region of interest in an application program can be accessed quickly without the emulating circuit executing all instructions since the boot-up sequence of development system 100.

The above detailed description are provided to illustrate specific embodiments of the present invention and is not intended to be limiting. Numerous modifications and variations within the present invention are possible. The present invention is defined by the appended claims.

```
;------------------------------------------------------------------------------
;         Copyright (c) Advanced Micro Devices
;         This program contains proprietary and confidential information.
;------------------------------------------------------------------------------
; Equates used for CPUID
CPUID_EBX              EQU    68747541H    ; 'htuA'
CPUID_ECX              EQU    444D4163H    ; 'DMAc'
CPUID_EDX              EQU    69746E65H    ; 'itne'
CPUID_EDX_1_K6         EQU    008001BFH
CPUID_EDX_8001_K6      EQU    008005BFH
CPU_UNKNOWN            EQU    0EEH
CPU_K6                 EQU    09999H
CPU_K5                 EQU    06666H
RELOC_SEG              EQU    0A000H
INDEX                  EQU    0005H
CR                     EQU    0DH
LF                     EQU    0AH
```

-continued

```
;State dump area offset in SMRAM area
SMI_BASE                    EQU    0FEF8H
SMM_EBX                     EQU    0FFDCH
;Codes displayed within SMI handler
SMI_START                   EQU    0AAH      ;SMI handler has the
                                             ;control
SMBASE_RELOC_FLAG           EQU    0A1H      ;Relocate SMI handler to
                                             ;reloc seg
SMI_ERROR_INSTALL           EQU    0E0H      ;SMI installation at
                                             ;3000:8000h failed
SMI_ERROR_RELOC             EQU    0E1H      ;SMI relocation has
                                             ;failed
SMI_END                     EQU    0BBH      ;Exiting from SMI
                                             ;handler
SMI_POST                    EQU    080H      ;display port in SMI
                                             ;handler
NORMAL                      EQU    0AFH      ;
; State map equates
K6_STATEMAP                 EQU    00E00H    ;
DEF_SM_STATEMAP             EQU    0FE00H
FSAVE_STATE                 EQU    06000H
SMI_SR                      EQU    07000H
NULL                        EQU    0         ;
;Chipset register
SVPCIK7_52                  EQU    052h      ; Misc Enable Register
JUMPER_INDEX_REG            EQU    22H
;**********************
;------------------------------------------------------------
;*        MACROS           *
;**********************
;
CPUID_MACRO      MACRO
        db       0fh, 0a2h
        ENDM
DUMMY_DELAY     MACRO
        nop
        nop
        nop
        nop
        nop
        nop
        ENDM
RSM_MACRO       MACRO
        db       0fh, 0aah
        ENDM
;================================================
;       SMI HANDLER INSTALLATION for SWITCH-OVER
;================================================
;--------------------------------------------------------------------
;       INSTALLATION OF SWITCH-OVER HANDLER
;       Here the Switch-Over handler is copied to SMRAM space and then
;       a software SMI is generated with a flag to relocate it to A000h
;       segment.
;--------------------------------------------------------------------
INST_SO_HND     proc    near
        cli
        pusha
        push    ds
        push    es
        mov     ax,03000h                    ;load default smram segment
        mov     es,ax                        ;in es
        mov     di,8000h                     ;make smi handler start @8000h
        push    cs
        pop     ds                           ;ds=cs
        xor     eax,eax                      ;read vendor id string
        cpuid_macro
        cmp     ebx,cpuid_ebx                ;correct id dword string?
        jnz     so_inst_ret
        cmp     ecx,cpuid_ecx                ;correct id dword string?
        jnz     so_inst_ret
        cmp     edx,cpuid_edx                ;correct id dword string?
        jnz     so_inst_ret
;Differentiate between K5 and K6 processors; if it is a K5 then
;load the handler and generate a software SMI
        mov     eax,1h
        cpuid_macro
        test    al,10h
        jnz     go_k5
        mov     ax, cpu_k6                   ;store a code for k6
        rol     eax, 10h                     ;store the code away
```

-continued

```
            mov    al,22h
            out    80h,al
            jmp    so_inst_ret
GO_K5:
            mov    ax, cpu_k5              ;
            rol    eax, 10h                ;store away the code
            mov    al,33h
            out    80h,al
            jmp    go_install              ;no,
UNKNOWN_CPU:
            mov    al, cpu_unknown
            out    80h,al
            jmp    $
GO_INSTALL:
            mov    si,offset cs:smi_so_handler ;start of smi handler
            mov    cx,offset cs: end_of_smi_so_handler;end of smi handler
            sub    cx,si                   ;size of code to be
                                           ;copied
            push   cx                      ;save relocation size
            push   si                      ;save source address
            push   di                      ;save destination address
            rep    movsb                   ;copy smi handler to smram area
            pop    di                      ;restore destination address
            pop    si                      ;restore source address
            pop    cx                      ;restore reloaction size
;verify the copy process
COMP:
            push   cx
            push   si
            push   di
            repe   cmpsb                   ;does not match with what we copied?
            pop    di
            pop    si
            pop    cx
            stc                            ;prepare for error
            jz     reloc_so                ;error return
            mov    al, smi_error_reloc     ;load error code
            mov    dx, smi_post
            out    dx, al                  ;display error code
            jmp    so_inst_ret
RELOC_SO:
;Generate a software SMI to relocate SMI handler
            ror    eax, 10h                ;restore the cpuid code
            cmp    ax, cpu_k6
            jz     so_inst_ret
            mov    ebx,smbase_reloc_flag   ;test code to be displayed on post
                                           ;card
            call   software_smi            ;generate smi with result in carry
                                           ;flag
            clc                            ;assume that it's succeeded
SO_INST_RET:
            pop    es
            pop    ds
            popa
            sti
            ret
INST_SO_HND   endp
;-----------------------------------------------------------------
;       Generate SMI using SV board chipset
;-----------------------------------------------------------------
SOFTWARE_SMI   proc    near
            push   ax
;reset smi-related registers
            mov    ah, svpcik7_52          ;misc enable register 1
            call   syslogic_read
            and    al, 10011111b           ;disable smi bits
            call   syslogic_write
            mov    ah, svpcik7_52          ;misc enable register 1
            call   syslogic_read
            or     al, 01100000b           ;enable smi
            call   syslogic_write
            pop    ax
            ret
SOFTWARE_SMI   endp
;*********************************************************************
;
;       SMM Handler: This routine is copied to SMRAM space
;
;*********************************************************************
;
```

-continued

```
;                Port 80h code legend for Switch Over:
;
;                Port 80h
;                ----------
;                AA = SMM started
;                BC = SMM ended
;
;                22 = K6 CPU
;                33 = K5 CPu
;********************************************************************
;
;====================================================================
SMI HANDLER
;====================================================================
;
;                IN = SMM_EBX - TEST FUNCTION NUMBER
;
;-------------------------------------------------------------------
SMI_SO_HANDLER  proc    near
        cli
        mov     al,22h
        out     85h,al
;Determine which CPU
        xor     eax,eax                 ;read vendor id string
        cpuid_macro
        cmp     ebx,cpuid_ebx           ;correct id dword string?
        jnz     error_msg               ;no,
        cmp     ecx,cpuid_ecx           ;correct id dword string?
        jnz     error_msg               ;no,
        cmp     edx,cpuid_edx           ;correct id dword string?
        jnz     error_msg               ;no,
        mov     eax,1h
        cpuid_macro
        test    al,10h
        jnz     go_amd_k5
        mov     al, 22h
        out     80h, al
        jmp     k6
;this is an amd cpu
GO_AMD_K5:
        mov     al,33h
        out     80h,al
        call    wait_a_while
        jmp     k5
ERROR_MSG:
        mov     al, cpu_unknown         ;error msg for unknown cpu
        out     dx,al
        jmp     $
K5:
;Set up registers
        mov     eax,cs:[smi_base]       ;load state dump base
        shr     eax,4                   ;convert to segment value
        mov     ds,ax                   ;set ds to sdump base
        mov     es,ax                   ;set es to sdump base
        mov     ss,ax                   ;set ss to sdump base
        mov     sp,0fe00h               ;set stack pointer
;Send post code
        mov     dx, smi_post            ;load display port for SMI handler
        mov     al, smi_start           ;SMI handler started in SMM
        out     dx,al                   ;display on post card
        call    wait_a_while            ;wait a while
        mov     si, smm_ebx             ;ptr to EBX save area (dword)
        mov     ebx, [si]               ;load EBX - bl has a function
number
        mov     al,bl
        out     dx,al
        call    wait_a_while
        cmp     bl, smbase_reloc_flag   ;SMBASE to be relocated?
        jz      smb_reloc               ;yes, go relocate
        call    k6_state_change         ;store the pentium states and
        mov     al, 0cfh
        out     80h, al
        hlt                             ;stop
        jmp     $                       ;just in case
;--- Relocate SMI handler from 03000h to 0A000h segment
SMB_RELOC:
        push    ds
        mov     ax,reloc_seg            ;load default smram segment address
        mov     es,ax                   ;in es
```

-continued

```
        mov         di,8000h                ;make smi handler start at 8000h
        puh         cs
        pop         ds                      ;ds=cs
        mov         si,offset cs:smi_so_handler ;start of handler
        mov         cx,offset cs:end_of_smi_so_handler ;end of handler
        sub         cx,si                   ;size of code to be copied
        mov         si,di                   ;si = di = 8000h
        push        cx                      ;save relocation size
        push        si                      ;save source address
        push        di                      ;save destination address
        rep         movsb                   ;copy smi handler to smram area
        pop         di                      ;restore destination address
        pop         si                      ;restore source address
        pop         cx                      ;restore relocation size
        repe        cmpsb                   ;does it match with what we copied?
        pop         ds
        stc                                 ;prepare for error
        jz          update_so_base          ;error return
        mov         al,smi_error_reloc      ;load error code
        mov         dx,smi_post
        out         dx,al                   ;display error code
        call        wait_a_while
        call        wait_a_while
        call        wait_a_while
        jmp         so_exit
UPDATE_SO_BASE:
        mov         si,smi_base             ;ptr to state dump base area
        mov         ebx,reloc_seg
        shl         ebx,4
        mov         [si],ebx                ;set new state dump base
        jmp         so_exit
K6:
        mov         ax,0a000h
        mov         ds,ax                   ;set ds to sdump base
        mov         es,ax                   ;set es to sdump base
        mov         ss,ax                   ;set ss to sdump base
        mov         sp,0fe00h               ;set stack pointer
;copy the states from the buffer copy to the default reserved locations
        mov         cx, 080h
        mov         esi, k6_statemap
        mov         edi, def_sm_statemap    ; restore the states in fe00
        cld
        rep         movsd
;restore fpu states, only if FPU present bit on the ISA card is set
        mov         al, 1                   ;bank 1 - second jumper word
        out         jumer_index_reg, al
        jmp         $+2
        jmp         $+2
        in          ax, jumper_index_reg
        jmp         $+2
        jmp         $+2
        test        ah, 020h
        jz          so_exit
        frstor      ds:[fsave_state]
SO_EXIT:
        mov         al,0bch
        out         80h,al
        mov         ah, svpcik7_52          ; misc enable register 1
        call        syslogic_read
;reset the smi bit while leaving the enable bit on
        and         al, 11011111b
        call        syslogic_write
;Resume from SMI
        rsm_macro
        dummy_delay
SMI_SO_HANDLER  endp
;--------------------------------------------------------------------
;       Delay routine
;--------------------------------------------------------------------
WAIT_A_WHILE PROC
        push        eax
        mov         eax,0080000h            ;delay count
so_loop:
        dec         eax
        jnz         so_loop
        pop         eax
        ret
WAIT_A_WHILE    ENDP
;------------------------------------------------------------------------------------
```

-continued

```
;       K6_STATE_CHANGE
;       Input: None
;       Output: None
;
;       The state mapping is done here; a copy of the states is created in
;       memory and then the K5 states are translated into a form the K6
;       expects them to be in; A code(0CEh) is posted on PORT80h card and ;
;       the processor is halted
;       immediately after that.
;       The appearance of this POST code is a cue for the user that the
;       system is ready for the switch-over
;--------------------------------------------------------------------------------
K6_STATE_CHANGE proc
;Store the original           K5    states away
        mov         eax,cs:[smi_base]           ;load state dump base
        shr         eax,4                       ;convert to segment value
        mov         ds,ax                       ;set ds to sdump base
        mov         es,ax                       ;set es to sdump base
        mov         ss,ax                       ;set as to sdump base
        mov         sp, def_smm_statemap        ;set stack pointer
        mov         cx, 080h
        mov         esi, def_smm_statemap
        mov         edi, k6_statemap            ; backup the states in 0e00
        cld
        rep         movsd
GO_MODIFY:
        mov         bp,sp                       ;access the stack amd modify
;modify the state-ram copy
;[1] k6 - es attr (pent - null)
        mov         eax, [bp + 12ch]            ; p - es attr
        call        set_k6_attr
        mov         dword ptr ds:[k6_statemap + 12ch], eax
;;[2] k6 - cs attr (pent - es attr)
        mov         eax, [bp + 138h]            ; p - cs attr
        call        set_k6_attr
        mov         dword ptr ds:[k6_statemap + 138h], eax
;;[3] k6 - ss attr (pent - cs attr)
        mov         eax, [bp + 144h]            ; p - ss attr
        call        set_k6_attr
        mov         dword ptr ds:[k6_statemap + 144h], eax
;;[4] k6 - ds attr
        mov         eax, [bp + 150h]
        call        set_k6_attr
        mov         dword ptr ds:[k6_statemap + 150h], eax
;;[5] k6 - fs attr
        mov         eax, [bp + 15ch]
        call        set_k6_attr
        mov         dword ptr ds:[k6_statemap + 15ch], eax
;;[6] k6 - gs attr
        mov         eax, [bp + 168h]
        call        set_k6_attr
        mov         dword ptr ds:[k6_statemap + 168h], eax
;;[7] k6 - ldt low(base)
        mov         eax, [bp + 170h]            ;k5 - base
        rol         eax, 10h                    ;extract the low word from k5
        mov         ebx, [bp + 16ch]            ;k5 - limit
        and         eax, 0ffff0000h
        and         ebx, 0ffffh
        or          eax,ebx                     ;prepare the ldt low
        mov         dword ptr ds:[k6_statemap + 16ch], eax
;;[8] k6 - ldt high
        mov         eax, [bp + 170h]            ;k5 base
        shr         eax, 16
        mov         bx, ax                      ;store base hi-16 bits
        shl         ebx, 16
        and         ebx, 0ff000000h             ;store base 24-31
        and         ax, 0ffh                    ;al=base 16-23
        or          eax, ebx                    ;eax - final base
        mov         ebx, [bp + 174h]            ;k5 attr
        shl         ebx, 8
        mov         ecx, ebx
        and         ecx, 0f0000h
        shl         ecx, 4
        or          ebx, ecx                    ;ebx=attr
        or          eax, ebx                    ;eax=attr&base
        mov         ebx, [bp + 16ch]            ;k5 limit
        and         ebx, 0f0000h                ;mask off bits 16-19
        or          eax, ebx                    ;eax=final ldt high
        mov         dword ptr ds:[k6_statemap + 170h], eax
```

-continued

```
;save fpu states
        fsave           ds:[fsave_state]
;Write the code on PORT80h to give the user an indication that
;the speed and processor switches can be flipped
        mov             al, 0ceh
        out             80h,al
        hlt
        jmp             $                       ;just in case . . .
        ret
K6_STATE_CHANGE endp
;--------------------------------------------------------------------------------
;       In this routine the K5 Attributes are set to the format that K6
;       expects
;       Input: EAX=K5 attr
;       Output:EAX=K6 Attr
;       Destroyed:EBX
;--------------------------------------------------------------------------------
SET_K6_ATTR     proc
        shl             eax,8
        mov             ebx,eax
        shr             ebx,16
        shl             ebx,20
        and             eax,0ffffh
        or              eax,abx
        ret
SET_K6_ATTR     endp
;--------------------------------------------------------------------------
;       Read from chipset registers to program the values to
;       generate a software SMI
;
;       INPUT = ah : register no. to be read
;       OUTPUT = al : data read
;--------------------------------------------------------------------------
SYSLOGIC_READ   proc
        push            cx
        push            dx
        push            eax
        mov             cl, ah                  ;Save register index
        mov             dx, 0cf8h
        mov             eax, 80000000h          ;Bus #0, Device #0, Fn #0
        mov             al, cl                  ;Load register index in al
        and             al, 0fch                ;Mask bit 0, 1 off
        out             dx, eax                 ;Build configuration cycle
        jmp             $+2
        jmp             $+2
        mov             dx, 0cfch
        mov             ah, cl                  ;Restore ah
        and             cl, 03h                 ;Get bit 0, 1
        add             dl, cl                  ;Select register index to read
        in              al, dx                  ;Read data in al
        mov             dx, ax                  ;Save ax in dx
        pop             eax                     ;Restore MSW of eax
        mov             ax, dx                  ;Restore ax (al = data read)
        pop             dx
        pop             cx
        ret
SYSLOGIC_READ   endp
;--------------------------------------------------------------------------
;       Write to chipset register to generate a software SMI
;
;       IN = ah : register no.
;       al : data
;--------------------------------------------------------------------------
SYSLOGIC_WRITE  proc
push            cx
push            dx
push            eax
mov             cx, ax                          ;Save ax in cx
mov             dx, 0cf8h
mov             eax, 80000000h                  ;Bus #0, Device #0, Fn #0
mov             al, ch                          ;Load register index in al
and             al, 0fch                        ;Mask bit 0, 1 off
out             dx, eax                         ;Build configuration cycle
jmp             $+2
jmp             $+2
mov             dx, 0cfch
mov             ax, cx                          ;Restore ah/al
and             ah, 03h                         ;Get bit 0, 1
add             dl, ah                          ;Select register index to read
```

```
                                -continued
out             dx, al              ;Write data
pop             eax                 ;Restore MSW of eax
mov             ax, cx              ;Restore ax
pop             dx
pop             cx
ret
SYSLOGIC_WRITE  endp
END_OF_SMI_SO_HANDLER:
```

We claim:

1. A computer system for emulating a processor under development, the computer system comprising:

a first terminal for receiving an interrupt signal wherein said interrupt signal is activated by a first switch controllable by a user;

a second terminal for receiving a halt signal;

a main memory;

a first processor receiving said interrupt signal, wherein said first processor is a processor to be emulated, and wherein said first processor, in response to said interrupt signal, (i) saves the states of a program executing in said first processor in said main memory system; and then (ii) halts operation of said first processor;

a second processor receiving said interrupt signal and said halt signal, wherein said second processor comprises a logic circuit emulating said first processor, and wherein said second processor, in response to said interrupt signal, (i) waits until said halt signal is deasserted; (ii) restores said states of said program form said main memory into said second processor; and (iii) resumes execution of said program from said restored states.

2. A computer system as in claim 1, further comprising second and third switches provided for asserting said interrupt signal and deasserting said halt signal respectively.

3. A computer system as in claim 1, wherein said first and second processors support operations under the system management mode of the X86 architecture.

4. A computer system as in claim 1, wherein said first and second processors operate at first and second clock frequencies respectively, said computer system further comprising a clock circuit generating said first and second frequencies.

5. A method for transferring control from a first processor to a second processor, said method comprising the steps of:

configuring said first and second processors in an emulation system, such that said first processor is a processor to be emulated, said second processor comprises a logic circuit emulating said first processor, and either of said first and second processors is provided control of said computer system, said first and second processors being configured for responding to a common interrupt signal, said second processor initially being placed in a hold state;

executing an application program in said first processor;

generating said interrupt signal to both said first and second processors, wherein said generating is controllable by a user, said interrupt having a higher execution priority than said executing application program;

suspending execution of said application program;

saving the execution states of said application program in said first processor to a memory device;

placing said first processor in a hold state;

releasing said second processor from its hold state;

loading the saved states of said application program from said memory device to said second processor; and resuming execution of said program in said second processor from said saved states.

6. A method as in claim 5, wherein said step of step of saving the execution states of said application program, and said step of placing said first processor in a hold state are controlled by a first interrupt handling program executed in said first processor.

7. A method as in claim 6, wherein said step of loading the saved states is controlled by a second interrupt handling program executed in said second processor, said second interrupt handling program returning from servicing said interrupt signal to allow carrying out in said second processor said step of resuming execution of said application program.

8. A method as in claim 7, wherein said first and second interrupt handling program are two copies of a common interrupt handling program, said common interrupt handling program performing, in said first processor, said step of saving the execution states of said program, and said step of placing said first processor in a hold state, and in said second processor, said step of loading the saved states and said step of resuming execution of said program, according to the identity of the processor executing said common interrupt handling program.

9. A method as in claim 8, wherein said first and second processor operate at first and second clock frequencies respectively, said first and second clock frequencies being generated from a common clock circuit.

* * * * *

UNITED STATES PATENT AND TRADEMARK OFFICE
CERTIFICATE OF CORRECTION

PATENT NO. : 6,106,565
DATED : August 22, 2000
INVENTOR(S) : Warren Stapleton et al.

It is certified that error appears in the above-identified patent and that said Letters Patent is hereby corrected as shown below:

Column 4,
Line 26, delete "108e" and substitute -- 109e --.

Signed and Sealed this

Nineteenth Day of November, 2002

Attest:

Attesting Officer

JAMES E. ROGAN
Director of the United States Patent and Trademark Office